United States Patent [19] [11] 4,065,520
Bailey et al. [45] Dec. 27, 1977

[54] GRADIENT POLYMERS OF TWO OR MORE ALPHA MONO-OLEFINIC MONOMERS CAPABLE OF POLYMERIZING WITH THEMSELVES AND EACH OTHER

[75] Inventors: Frederick Eugene Bailey; Werner Claus von Dohlen, both of Charleston, W. Va.; Markus Matzner, Edison, N.J.; Robert Hayward Young, Somerville, N.J.; Lloyd Mahlon Robeson, Whitehouse Station, N.J.

[73] Assignee: Union Carbide Corporation, New York, N.Y.

[21] Appl. No.: 692,923

[22] Filed: June 4, 1976

[51] Int. Cl.$^2$ ................... C08F 10/00; C08F 297/08
[52] U.S. Cl. ................................. 260/878 B; 526/87
[58] Field of Search ...................... 260/878 B; 526/87

[56] References Cited

U.S. PATENT DOCUMENTS 3,804,881   4/1974   Bassett et al. ..................... 526/87

OTHER PUBLICATIONS

"Block Copolymers", Ed. by Allport et al., J. Wiley & Sons, New York (1973), pp. 499–502.

Primary Examiner—Alan Holler
Attorney, Agent, or Firm—Peter R. Shearer

[57] ABSTRACT

Polymers of at least two different alpha monoolefinic monomers capable of polymerizing with themselves and each other. The polymers comprise a plurality of polymer chains along which the proportion of mer units provided by a first such monomer for a given first chain length gradually increases as the proportion of mer units provided by a second such monomer along the first chain length gradually decreases to a second chain length along which the proportion of mer units provided by the first and second monomers, respectively, remain substantially constant throughout said second chain length. Also, included are polymers of this type wherein the polymer chains comprise a third chain length along which the proportion of mer units provided by the first monomer is greater than the minimum proportion of the same type of mer units in the given first chain length and remains substantially constant throughout the third chain length. In this case the third chain length is connected to one end of a fourth chain length which is connected at its other end to the given first chain length and the proportion of mer units provided by the first monomer gradually diminishes along the fourth chain length as the proportion of mer units provided by the second monomer gradually increases along the fourth chain length to the respective proportions of mer units provided by the first and second monomers at the beginning of the given first chain length at the point of attachment of the fourth chain length to the given first chain length.

20 Claims, 1 Drawing Figure

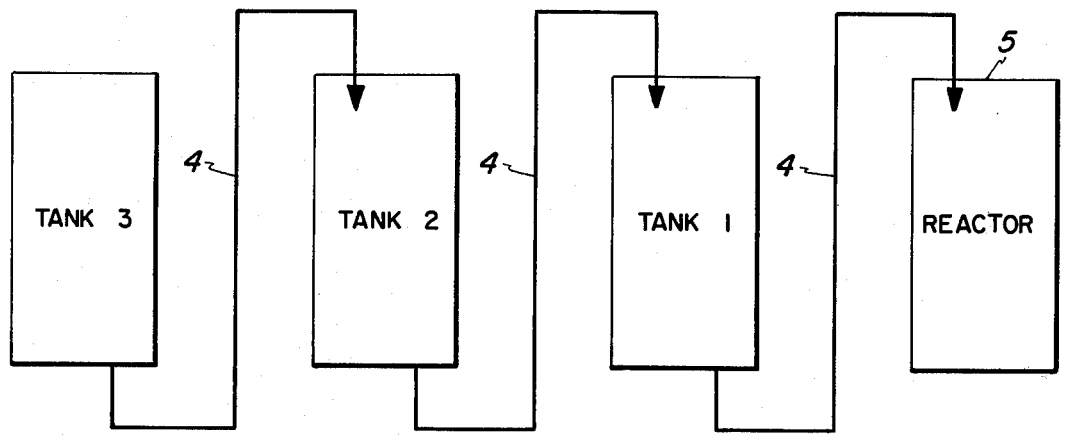

GRADIENT POLYMERS OF TWO OR MORE ALPHA MONO-OLEFINIC MONOMERS CAPABLE OF POLYMERIZING WITH THEMSELVES AND EACH OTHER

BACKGROUND OF THIS INVENTION

1. Field Of This Invention

This invention relates to new types of polyolefin copolymers prepared from gaseous monomers and more specifically to ethylene-propylene copolymers.

2. Prior Art

A wide variety of polymers made from one or more alpha-olefins are in extensive use for a wide range of applications. For example, several grades of polyethylene are commercially available. These are low density polyethylene (LDPE) produced by a high pressure reaction and high density polyethylene (HDPE) produced by a low pressure fluid-bed, or slurry, transition metal catalyzed reaction. In addition, there are commercially produced a series of copolymers for example, the ethylene-ethyl acrylate (EEA) series. All of these resins have applications as insulating covers in the wire and cable area among others. They are flexible but are deficient in higher temperature properties. There has been, therefore, considerable interest in the preparation of LDPE-type products having higher melting points and which are based on polypropylene.

Ethylene-propylene copolymers are well known. Block copolymers of these two alpha-olefins are also well known. Commercially available polypropylene resins are either homopolymers or of the AB type propylene-ethylene copolymers. These AB block copolymers, although having improved impact strength over polypropylene are still high modulus plastics (100,000 psi). A recent polymer, now being commercialized does have a lower modulus (about 15,000 psi) but is deficient in tensile strength and elongation. In addition, these materials appear to be graft copolymers of propylene and ethylene-propylene rubber (EPR) and thus require an additional mixing step in their preparation, are chemically ill defined and contain appreciable amounts of homopolymer which detract from their mechanical properties.

The alpha-olefinic polymers of this invention have significantly different and improved mechanical properties over existing commercial copolymers, blends of polypropylene and EPR as well as LDPE and EEA.

Certain process techniques disclosed in U.S. Pat. No. 3,804,881, and to some extent disclosed in U.S. Pat. No. 3,839,293, may be employed in the practice of this invention. However, the polymers of this invention are not disclosed in either of these patents. The polymers disclosed and claimed herein are new and possess unexpected beneficial properties not heretofore attained for polymers made from the same monomers. Attention is also drawn to U.S. Pat. Nos. 3,427,287; 3,448,173 and 3,562,235 and British Pat. No. 1,292,226. None of these latter patents disclose the polymers of this invention or techniques for making them. No other more pertinent prior art is known.

BROAD DESCRIPTION OF THIS INVENTION

An object of this invention is to provide a polyolefin copolymer prepared from gasous monomers. A further object of this invention is to provide polyolefin copolymers which are thermoplastic elastomers and have a relatively flat response of stiffness to temperature change over a broad range. Other objects and advantages of this invention are set out herein or are obvious to one ordinarily skilled in the art herefrom. Another object is to provide block copolymers of well defined structure. A further object is to provide copolymers having significantly improved mechanical properties over existing commercial copolymers, blends, homopolymers and elastomers. This invention achieves these objects and advantages.

The present invention relates to polymers of at least two different alpha mono-olefinic monomers capable of polymerizing with themselves and each other. The polymers comprise a plurality of polymer chains along which the proportion of mer units provided by a first of the monomers for a given first chain length gradually increases as the proportion of mer units provided by a second of the monomers along the first chain length gradually decreases to a second chain length along with the proportion of mer units provided by the first and second monomers, respectively, remain substantially constant throughout the second chain length.

The present invention also relates to polymers of this type wherein the polymer chains comprise a third chain length along with the proportion of mer units provided by the first monomer is greater than the minimum proportion of these mer units in the given first chain length and remains substantially constant throughout the third chain length. The third chain length is connected to one end of a fourth chain length which is connected at its other end to the given first chain length. The proportion of mer units provided by the first monomer gradually diminishes along the fourth chain length as the proportion of mer units provided by the second monomer gradually increases along the fourth chain length to the respective proportions of mer units provided by the first and second monomers at the beginning of the given first chain length at the point of attachment of the fourth chain length to the given first chain length.

In addition, this invention includes polymers of the type described above wherein the first and fourth chain lengths are connected by a fifth chain length in which the respective proportions of the respective mer units remain substantially constant throughout the fifth chain length and the respective proportions are essentially the same as at the beginning of the given first chain length.

Another type of polymer covered by this invention is a polymer of the type described above wherein the chain lengths are repeated in substantially the same order and proportions in the polymer chain.

Still another type of polymer covered by this invention is one in which the polymer chains comprise first and second chain lengths as described above and a third chain length connected to the second chain length at the end opposite to that to which the first chain length is connected and along which the proportion of mer units provided by the first monomer decreases as the proportion of mer units provided by the second monomer increases.

A further type of polymer covered by this invention is one in which the polymer chains comprise first and second chain lengths and a third chain length connected to the end of the first chain length opposite to that to which the second chain length is connected and the respective proportions of mer units provided by the first and second monomers is substantially the same as the approximate levels existing at the end of the first chain length to which the third chain length is connected.

This invention involves graded or non-uniform, thermoplastic, copolymers comprised of mers derived from two or more alpha-olefins, e.g., ethylene and a different olefin and are prepared by the process which utilizes the steps of continuously introducing at least one primary gaseous polymerizable feed composition, such as, ethylene and a non-ethylene alpha-olefin, from at least one primary feed source to a polymerization zone, the primary gaseous polymerizable feed composition continually varying in compositional content of the polymerizable reactants therein during the continuous introduction; simultaneously adding to the primary feed source at least one different secondary gaseous polymerizable feed composition, such as, ethylene and a non-ethylene alpha-olefin, from at least one secondary feed source so as to continually change the compositional content of the polymerizable reactants of the primary gaseous polymerizable feed composition in the primary feed source; and continuously polymerizing the primary gaseous polymerizable feed composition introduced to the polymerization zone until the desired polymerization has been achieved. The primary gaseous polymerizable feed composition is different from the secondary polymerizable feed composition. The concepts of this invention allow the synthesis of broad composition distribution copolymers in a highly controlled manner. The invention involves the feeding of only gaseous monomers to the reactor and uses the concept of continuously varying the composition in the olefin copolymerizations.

The products of this invention have broad distribution compositions which are characterized by broad thermomechanical (glass) transitions. The products of this invention can be thermoplastic elastomers whch can be used, for example, for shock absorption in motor mounts and bumper attachments. The products of this invention can be used also for wire and cable covering applications. The products of this invention are also useful as latex coatings.

The products of this invention have physical properties which are distinct from the usual homopolymer or random copolymers or the block copolymer compositions heretofore known. The gradual compositional change results in a smooth transition from crystalline to amorphous regions. The invention allows the preparation of copolymers that combine both excellent high and low temperature properties and the desired moduli over a broad temperature range.

BRIEF DESCRIPTION OF THE DRAWING

The drawing is a schematic diagram illustrating the apparatus and method used to produce the polymers of this invention. The apparatus shown includes three closed tanks 1, 2 and 3 and interconnecting piping 4 so arranged that the gaseous contents of tank 3 can be caused to flow into the gaseous contents of tank 2 which can be caused to flow into the contents of tank 1 which can be caused to flow into reactor 5. Suitable valves (not shown) and pressure regulators (not shown) are also provided to close off one or more of the tanks from each other and the reactor. Means are also provided for charging tanks 1, 2 and/or 3 with the alpha-olefins desired to be polymerized.

DETAILED DESCRIPTION OF THE INVENTION

This invention, in a preferred form, when applied to the copolymerization of ethylene and propylene, yields polypropylene-co-graded-ethylene-propylene copolymer-co-graded-polypropylene resins. These resins have crystalline to semi-crystalline to amorphous regions and gradient changes in between. This results in some unexpected properties. The resins have flexibility that is comparable to low density polyethylene (LDPE) and/or ethylene-ethyl acrylate copolymers yet have improved melting points by 35°–45° C. In addition, they have improved low temperature properties over polypropylene. This invention, when applied to the copolymerization of ethylene and propylene, gives a wide variation of copolymers with different properties and compositions. These include A-B, A-B-A, A-AB-A, A-AB-A-AB . . ., etc., with preprogrammed gradations between each of the areas or blocks in the polymer molecule. This allows for excellent control of desirable properties and improvement over existing polymers.

The polymerizations are conveniently carried out at room temperature although higher temperatures are advantageously used. The temperature of polymerization can range from 20° C or less to 70° C or higher.

The reactions are usually carried out at elevated pressures, for example, up to about 500 psig or more, preferably 5 to 300 psig.

Catalysts for the low pressure polymerization of alpha-olefins, such as ethylene, propylene and butene-1, generally fall into two classes (*Y. Taknegami* and *T. Suzuki*, J. Polymer Sci., B9 109 (1971), namely, those tending to give "block" copolymer structures, and those tending to give more nearly random copolymers. If A represents one monomer and B represents the comonomer, a "block" structure could be represented as a sequence of A followed by a sequence of B, and soforth:

—AAAAABBBBAAAABBBBBBBAAA— while a more random structure would be represented as:

—ABAABABBAABABAABBBA—.

It is known in the art that, generally, titanium based catalysts, e.g., a titanium chloride-diethylaluminum chloride catalyst, tend to give "block" copolymer structures while vandium based catalysts tend to be more random. The vanadium based catalysts are exemplified by vanadium oxychloride-diisobutylaluminum chloride catalyst [$VOCl_3$ + iso—$(C_4H_9)_2AlCl$] and are useful in controlling the polymer composition by variation of monomer feed. Any suitable catalyst can be used, however, in the polymerization of two of more olefins pursuant to this invention.

The preferred useful alpha-olefins are those which are gaseous at room temperature (at atmospheric and elevated pressures). Examples of useful alpha-olefins which are gaseous at room temperature, are ethylene, propylene, 1-butene, 2-butene and 3-methylbutene-1. Examples of useful olefins, which are gaseous at above room temperature, are butadiene, 1-pentene, 3-methyl-1-pentene, 4-methyl-1-pentene, 2-methyl-1-pentene, 3,3-dimethyl-1-pentene, 2-pentene, 4-methyl-2-pentene, 3-methyl-2-pentene, 1-hexene, 2-hexene, styrene, 3-hexene, 3-methyl-2-butene, 2-ethyl-1-butene, 2,3-dimethyl-1-butene, 2-methyl-1-butene, 3,3-dimethyl-1-butene, 3-methyl-1-butene and acenaphthylene.

The polymers of this invention are quite advantageously produced through the use of the apparatus described in the application entitled "Apparatus For Copolymerizing Gaseous Monomers" (U.S. Ser. No. 693,131, filed June 4, 1976) filed concurrently herewith by Robert H. Young and Markus Matzner, the disclosure of which is incorporated herein by reference. Nevertheless, any suitable apparatus or technique for producing the polymers can be used. The polymerization techniques using varying monomer concentrations as disclosed in U.S. Pat. No. 3,804,881 can be employed in producing the polymers of this invention and the disclosure of this patent is incorporated herein. The apparatus shown in the drawing is advantageously used in which the reactor 5 can be attached to a high pressure reactor for a slurry polymerization or to a fluidized bed reactor for gas phase reactions.

In slurry polymerizations, liquid carrier or solvent, such as, heptane, can be used in the reactor.

Molecular weight control can be maintained through the use of hydrogen or diethylzinc. The hydrogen can either be introduced at a constant rate or periodically pulsed if better "block" formation is desired. The preferred molecular weight results in a melt index from 0.5 to 5.0 grams/10 min. at 220° C and 1 P (43.25 psi).

The unique gradient copolymers of ethylene and propylene of this invention can be varied in the total ethylene content and extent of polypropylene crystalline regions. They exhibit an unusual combination of mechanical properties with intermediate to low tensile moduli and have good tensile strengths and elongations. They have improved high temperature properties compared to LDPE and EEA and have improved low temperature properties compared to isotactic polypropylene. The results obtained by this invention show that a new class of ethylene-propylene copolymers has been prepared through the application of the concepts and techniques of this invention. The advantages realized by the introduction of "gradation" into the polymers of this invention are completely unexpected.

A particularly preferred form of the polymers of propylene and ethylene, as prepared in accordance with this invention, is an A-AB-A product with gradients from a block of isotactic polypropylene (A) to an amorphous region containing ethylene and propylene (AB) and back to a crystalline polypropylene block. The total composition of ethylene can vary from 5-95% with the maximum in the feed up to 100%. The isotactic polypropylene fraction can vary from 0 to 90%. In the particularly preferred form, the molecule preferably contains from 15-30% ethylene, a maximum of 40-60% ethylene at the peak, and with isotactic polypropylene end blocks representing from 10-50% of the molecule. This produces a resin with tensile moduli from 5000 to 30,000 psi, which are especially preferred. All of these materials are useful polymers per se and also are compatible additives to polypropylene and HDPE for such applications as improvement of impact and stress crack resistance thereof.

Alternate modifications can be achieved through the use of other combinations of monomers. These include ethylene-propylene copolymers modified with butylene, butadiene, hexene, etc. Other reaction conditions can also be used to prepare these copolymers and alternate copolymers. The reaction conditions may vary from solution, slurry to gas-phase reactions, with most polyolefinic catalysts applicable depending upon the desired properties and compositions of the resins.

Generally, the polymerization producing the graded portion of the novel polymers of this invention is carried out by pumping monomer A (or allowing it to flow) from tank 1 into the reactor 5 and simultaneously pumping monomer B from tank 2 into tank 1 and ultimately into the reactor 5. If the polymerization reaction occurs at a rate equal to the rate of monomer feed, then the composition of the polymer formed at any point in time will be substantially the same as the composition of the feed at that time. To expand the number of potential feed profiles, a three tank array is provided for the gas monomer system. The three tank system expands the number of potential compositional profiles to an unlimited extent and allows for more versatility in the preparation of these novel polymeric materials. With this system the "pumping" is achieved by carrying out the reaction at a pressure lower than that present in the monomer feed tanks. As the polymerization occurs the monomers continue to be fed on demand to the reactor. The reactor 5 itself can be an autoclave equipped with a mechanical stirrer and gas inlet and exit valves. The three tank system is then connected to the reactor 5. All parts of the apparatus are preferably of stainless steel and the capacities of the tanks 1, 2 and 3 can be varied for added versatility.

For slurry reactions a minimum quantity of dry, degassed hexane or other suitable solvent (the amount depending upon the size of the reactor) is added to the reactor. The catalyst is then added to the reactor (e.g., 10 mmols of $TiCl_3$ and 30 mmols of $Et_2AlCl$, both in hexane) followed by purging of the reactor with propylene at atmospheric pressure. The desired amount of gas for each separate block is charged to the feed tanks (calculated from volume-pressure relationships) for each stage of the polymerization. The graded portion involved the use of two or more tanks depending upon the desired composition profile with each tank containing from 0 to 100% ethylene.

While the polymers of this invention appear to produce compatible systems, their modulus-temperature profile is more like that of an imcompatible type in thermomechanical response. This makes the polyolefin copolymers of this invention ideal for automotive elastomer applications, that is, they have a relatively temperature insensitive modulus plateau.

In the process used to produce the graded portion of the polymers of this invention, the concentrations of the polymerizable reactants in the primary gaseous polymerizable feed composition are continually changing during the introduction of the primary gaseous polymerizable feed mixture to the polymerization zone by the simultaneous addition of a different secondary gaseous polymerizable feed mixture to the primary polymerizable feed mixture. The distinguishing feature of a process such as this is the introduction of primary gaseous polymerizable feed mixture to the polymerization zone from a primary feed source while simultaneously introducing at least one different secondary gaseous polymerizable feed composition from a secondary feed source to the primary gaseous polymerizable feed composition in the primary feed source.

The polymerization zone is any reactor, properly equipped, that can be used for the production of polymers. The different types of reactors and their suitability for a particular polymerization reaction are well known to those skilled in the art and do not require elaboration herein. Connecting to the polymerization reactor is at least one primary feed source. The term primary feed source defines one or more tanks or sources of gaseous polymerizable reactants feeding directly into the polymerization zone or reactor, for example, it can be an in-line (enclosed) mixer or a tank. The primary feed source can be equipped withe efficient mixing means to assure rapid mixing of the contents thereof, although it has been found that mixing by diffusion automatically takes palce rapidly enough in the usual case. More than one primary feed source may be used. Connecting, in turn, to any of the primary feed sources is at least one secondary feed source. The term secondary feed source defines one or more tanks or sources of gaseous polymerizable reactants feeding to any of the primary feed sources. There can be one or more secondary feed sources with all of the secondary feed sources feeding directly into the primary feed source, or one or more of the secondary feed sources can feed in series to another secondary feed source and thoroughly mixed therein with finally an ultimate secondary feed source feeding directly into one or more of the primary feed sources. The rate of feed from any one feed source to any other feed source or tank, whether primary or secondary, can be varied at the will of the skilled scientist to meet his desires and objectives. The polymer configurations that can be engineered are many; however, in all instances there must be a polymerization zone or reactor connected to at least one primary feed source or tank which may or may not be equipped with mixing means which in turn is connected to at least one secondary feed source or tank which secondary feed sources (when more than one thereof is used) can all or in part feed directly into one or more of the primary feed sources or tanks or can feed in series into one another and ultimately feed into the primary feed soruces or tanks.

The primary gaseous polymerizable feed composition is the mixture of reactants present at any particular time in the primary feed source or tank. This mixture can contain the gaseous polymerizable reactants alone or it can include any additive which will not have a deleterious effect on the polymerizable reactants (for example, non-solvent gaseous diluents, colorants, antioxidants, stabilizers, initiators and the like. During polymerization of the graded portion of the polymer, the compositional content of the primary gaseous polymerizable feed composition is continually changing as secondary polymerizable feed composition is fed into and mixed with it. By the term "compositional content" is meant the content or concentration in the gaseous polymerizable feed composition of each reactant herein.

As becomes apparent from this teaching and description the simultaneous feeding of the primary gaseous polymerizable feed composition from the primary feed source to the polymerization zone and feeding of a different secondary gaseous polymerizable feed composition from the secondary feed source to the primary feed source will result in a continual change of the content or concentration of each reactant present in the primary gaseous polymerizable feed composition or in the compositional content of the primary gaseous polymerizable feed composition. This continual change in compositional content can also occur in the secondary gaseous polymerizable feed compositions when more than one thereof is being used and they are feeding in series into each other before ultimately feeding into the primary gaseous polymerizable feed composition.

The secondary gaseous polymerizable feed composition is the mixture of reactants presents at any particular time in any one or more of the secondary feed sources or tanks and can contain the same types of additives that were previously indicated could be present in the primary gaseous polymerizable feed composition. It should be remembered, however, that polymerization conditions are to be avoided in the primary and secondary feed sources, for example, if one of the gaseous polymerizable feed mixtures contains one of the components of a catalyst system, the other such mixture cannot contain the other component thereof, otherwise polymerization will occur in the feed tanks before the gaseous polymerizable reactants are introduced into the polymerization zone.

In the process used to produce the polymers of this invention, the primary gaseous polymerizable feed composition can initially contain a single gaseous polymerizable reactant or it can initially contain a plurality of gaseous polymerizable reactants; the same is true for the initial content of the secondary gaseous polymerizable feed composition. However, when the primary gaseous polymerizable feed composition is a single gaseous reactant the secondary gaseous polymerizable feed composition cannot be solely that same single gaseous reactant, it can be a different single gaseous reactant or a mixture of a plurality of gaseous reactants that can include that same gaseous reactant in the mixture. Likewise, when the primary gaseous polymerizable feed composition is a mixture of a plurality of gaseous reactants the secondary gaseous polymerizable feed composition cannot be that same mixture having the same concentration for each gaseous reactant, it can be a single gaseous reactant or it can be a different mixture of gaseous reactants or it can be a mixture of the same gaseous reactants but at different initial concentrations of the gaseous reactants. The important and ever present factor is that the initial compositional contents of the primary gaseous polymerizable feed composition and of the secondary gaseous polymerizable feed composition are always different, they are not initially identical in make-up of gaseous polymerizable reactants. For example, in the production of ethylene-propylene copolymers, at least some ethylene must be in one feed source and at least some propylene or other non-ethylene alpha-olefin must be in the other feed source.

As a result of the initial differences in the compositional contents of the primary and secondary gaseous polymerizable feed compositions and of the simultaneous additions of secondary polymerizable feed composition to primary gaseous polymerizable feed composition while the primary gaseous polymerizable feed composition is introduced into the polymerization zone there is a continual variation in the compositional content of the primary gaseous polymerizable feed composition. Hence, any portion of the primary gaseous polymerizable feed composition entering the polymerization zone is at all times different than the portion that preceded it and the portion that succeeds it. Consequently, the composition of the polymer produced in the reactor during the addition is likewise continuously changing and reflects the composition of the primary gaseous polymerizable feed composition entering the polymerization zone. In rapid polymerization reactions, such as are encountered in the present invention, i.e., one wherein there is essentially instantaneous reaction of the gaseous monomers when they are introduced into the polymerization zone, one has what is known as a monomer starved system. In other reactions one may have a so-called rich system, i.e., a system in which there is some time delay between introduction of the gaseous reactants to the polymerization zone and essentially complete polymerization of the gaseous reactants.

Thus, in a monomer starved system in making the polymers of this invention, the polymer produced at any one period of time differs in compositional content from that of the polymer produced prior to that period of time or subsequent to that period of time. However, in a monomer rich system the composition of the polymer formed at any instant is dependent upon the concentration of each gaseous monomer in the polymerization zone and the respective reactivity of each gaseous monomer present therein in relation to the other gaseous monomers present. There are thus produced certain novel non-uniform polymer compositions of polymer molecules having infinite variations in molecular structures. Thus, the final product is a polymer wherein the composition of polymer chain segments produced during the polymerization will vary to a large degree depending upon the compositional content of the primary feed composition introduced into the polymerization reactor.

The process used to produce the graded parts of the polymer of this invention can be described in its simplest manner as a reaction involving a single primary feed source initially containing a single gaseous polymerizable reactant and a single secondary feed source initially containing a single different gaseous polymerizable reactant. The contents in the primary feed source or tank at any one time during the process are known as the primary gaseous polymerizable feed composition and the contents of the secondary feed source or tank are known as the secondary gaseous polymerizable feed composition. The secondary feed source feeds into the primary feed source by suitable lines and pumps; the primary feed source, if desired, is equipped with an efficient stirrer or mixer and feeds into the polymerization zone. At the start of the polymerization of the graded portion, the flow of primary gaseous polymerizable feed composition from primary feed source to the polymerization zone is commenced at a predetermined rate. Simultaneously, the flow of secondary gaseous polymerizable feed composition from secondary feed source to the primary feed source is initiated and this rate of flow can be the same as or different than the rate of flow from the primary feed source of the polymerization zone. As the secondary gaseous polymerizable feed composition enters the primary feed source it is thoroughly mixed by diffusion or mechanical means with the contents thereof resulting in a continual change in the compositional content of the primary gaseous polymerizable feed composition. This continually changing primary gaseous polymerizable feed composition is simultaneously and continuously entering the polymerization zone and the polymer portion or chain length produced therein is varied in accord with the compositional content of the mixture of gases introduced into the polymerization zone. As is apparent from the prior description either or both of the primary or secondary feed source can contain more than one polymerizable reactant.

The variations in the engineering arrangements of the primary and secondary feed sources are innumerable and no attempt will be made to set forth each specific tank configuration or arrangement possible; these can readily be devised by skilled individuals at will for the purpose of obtaining maximum operational efficiency or for the purpose of obtaining products having certain desired properties. In the preceding paragraph there has been outlined a simple arrangement employing a single primary feed source and a single secondary feed source. Slightly more complex arrangements would be obvious to those skilled in the art and include those arrangements wherein there is a single primary feed source and a plurality of secondary feed sources; in these instances all of the secondary feed sources could be feeding in parallel directly into the primary feed source or some of the secondary feed sources could be feeding in series to other secondary feed sources with at least one secondary feed source, whether in series or not, ultimately feeding directly into the primary feed source. Other arrangements would be those wherein there are a plurality of primary feed sources; in these instances there could be a single secondary feed source feeding into one or more of the plurality of the primary feed sources, or there could be a plurality of secondary feed sources all feeding in parallel directly into only one of the primary feed sources, or a plurality of secondary feed sources directly feeding into more than one primary feed source or all of the plurality of secondary feed sources could be feeding in series into only one of the primary feed sources, or the plurality of secondary feed sources can be feeding in series into more than one of the primary feed sources. When a plurality of secondary feed sources is used they can be used in any combination desired, all can be used in series, some can be used in series while others are not, or none need be used in series with all of them being added directly to the primary feed source. In all instances, the primary feed sources feed the primary polymerizable feed composition to the polymerization zone; the secondary feed sources feed the secondary gaseous polymerizable feed composition directly to the primary feed source or in series to another secondary feed source with the reactants therein ultimately terminating in the primary feed source before entering the polymerization zone. During these movements of reactants from one feed source to another there is a resultant continual change in the compositional content of the contents of the tank to which polymerizable reactant is added and the contents of the tanks are agitated to obtain efficient mixing of the contents therein. One can also vary the process by having periods of time at the start, during, or near the end of the reaction wherein there is feeding of primary polymerizable feed composition from the primary feed source into the polymerization reactor without any simultaneous feeding of secondary polymerization feed composition into the primary feed source or tank for a selected period of time. In addition, the flow rates between feed tanks or polymerization zone can be varied at will at any time during the polymerization reaction. One can also, with suitable known means, using variable feed valves, feed polymerizable reactants from a plurality of secondary feed sources through an enclosed in-line mixer which serves as the primary feed source wherein the primary gaseous polymerizable feed composition is produced. The in-line mixer then feeds the primary polymerizable feed composition directly into the polymerization zone.

In this invention, non-uniform polymers are produced in a controlled manner. By the term "non-uniform polymer" is meant a polymer composition produced by the reaction of gaseous polymerizable reactants mixture which during a portion of the polymerization period is continually changing in compositional content.

The concentrations of a particular gaseous polymerizable reactant initially present in the primary gaseous polymerizable feed composition or initially present in the secondary gaseous polymerizable feed composition can vary from 0.01 weight percent to 100 weight percent based on the total weight of polymerizable reactants initially present in the particular feed stream. These concentrations can be varied at the will of the skilled individual, as is recognized in the art, to obtain the particular final concentrations of each gaseous reactant in the polymer or to obtain a particular property or characteristic in the polymer. The rate of flow from secondary feed sources and from primary feed sources can also be varied at the will of the skilled individual and do not require elaborate discussion herein. The process employs the temperature and pressure conditions known to be suitable for the gaseous reactants employed.

The polymerizable feed compositions can contain in the usual known amounts, photosensitizers, colorants, activators, catalysts, and other additives conventionally used in olefin polymerization reactions, all of which are known as in their use. The catalysts themselves are not part of the instant invention. The catalysts are employed in the conventional manner at the conventional concentrations. The solid polymers can be recovered by conventional means.

In the following examples given below all temperatures are in ° C unless otherwise specified, all parts and percentages are on a volume basis unless otherwise specified, the designation mmols means millimols, and the following abbreviations are used:

TM = tensile modulus, psi
TS = tensile strength, psi
PI = pendulum impact strength, ft.lb./cu.in.
MI = melt index at 220° C and 1P (43.25 psi).
$T_2$ = the temperature in ° C. at which the tensile modulus equals 100 psi.

EXAMPLE 1

Tank 1 was charged with propylene to a pressure of 75 psig and the charging valves were opened to admit propylene into the reactor which was previously charged with 300 ml of dry, degassed hexane, 10 mmols of titanium trichloride and 30 mmols of aluminum diethylchloride. The reactor was maintained at room temperature (23°–25° C). Tanks 1, 2 and 3 had a capacity of 500 cc each. Propylene was fed into tank 1 until the pressure in tank 1 was 75 psig and then fed to the reactor until the pressure dropped to 15 psig which took about 30 minutes whereupon more propylene was charged into tank 1 to bring the pressure up to 30 psig. The propylene was then passed to the reactor over a period of about 15 minutes until the pressure in tank 1 reached 15 psig. This amounted to approximately 2500 cc of propylene over a period of ¾ of an hour.

Thereafter, tank 1 was charged to 75 psig with propylene, tank 2 was charged to 75 psig with ethylene and tank 3 was charged to 75 psig with propylene. Valves were opened so that the contents of tank 3 flowed into tank 2 and the contents of tank 2 flowed into tank 1 and the contents of tank 1 flowed into the reactor. These valves were allowed to remain open until the pressure in tanks 1, 2 and 3 dropped to approximately 5 psig. Thereafter, additional propylene was added to tanks 1 and 2 to bring the pressure of said tanks up to 15 psig. Valves were again opened so that the contents of tank 2 flowed into tank 1 and the contents of tank 1 flowed into the reactor for polymerization until the pressure in tanks 1 and 2 reached about 5 psig. This amounted to the addition for polymerization of about 7500 cc of the combined olefinic monomers over a period of about 2 hours. Thereafter, all valves were closed and tank 1 was charged with propylene to a pressure of 75 psig by opening the appropriate valves from a propylene supply tank. Thereafter, appropriate valves were opened to allow the propylene in tank 1 to pass to the reactor for polymerization until the pressure in tank 1 fell to 15 psig. Tank 1 was recharged again with propylene to 30 psig and discharged into the reactor to 15 psig. At this point, valves were shut and the polymerization was continued for a short time to insure essentially complete polymerization. The amount of propylene added at this last addition was approximately 2500 cc over a period of ¾ hour. The feed rate of the olefin gas was about 55.56 cc per minute over a period of 3¾ hour. The yield was 24.9 grams of copolymer having the properties listed in Table 1 below.

EXAMPLE 2

The reactor was charged with 30 mmols of aluminum diethylchloride and about 10 mmols of titanium trichloride and about 300 cc sodium chloride which was dried at about 80° C. A one liter autoclave was employed as the reactor and the catalyst was added to the sodium chloride which was heated to 60° to 90° and degassed with nitrogen to remove excess hexane. The reactor was maintained throughout at a temperature of 65° C. The polymerization was carried out under gas phase conditions using a fluidized bed in which the catalyst was mixed. Tanks 1, 2 and 3 had a capacity of 500 cc. Tank 1 was filled with propylene to 75 psig and fed to the reactor until the pressure in tank 1 reached 0 psig. After a pause of 15 minutes, tank 1 was filled with propylene to 75 psig and tank 2 was filled with ethylene to 75 psig. The contents of tank 2 were fed into the contents of tank 1 which were sent to the reactor. This was continued until the pressure in tanks 1 and 2 reached 52 psig.

All three tanks were purged with ethylene which was then added to each of them to a pressure of 7.5 psig. Thereafter, propylene was added to all three tanks to a pressure of 75 psig. At this point, the contents of tank 3 were fed to the contents of tank 2 which were fed to the contents of tank 1 which were fed to the reactor. This was continued until the pressure within the tanks dropped from 75 to 30 psig. Then, tank 1 was filled to 20 psig with a mixture of ethylene and propylene gas containing 25% by volume of ethylene. Tank 2 was filled to 20 psig of propylene. The contents of tank 2 were fed into the contents of tank 1 which were fed into the reactor until the pressure in the tanks dropped from 20 psig to 5 psig. Propylene was then added to tank 1 without purging to increase the pressure therein to 15 psig. The contents of tank 1 were fed into the reactor until the pressure dropped to 5 psig. Propylene was again added to tank 1 to increase its pressure to 15 psig and again was fed into the reactor until the pressure dropped to 5 psig.

The reactor was held without further additions for about 15 minutes. Then, the sequence of additions of gaseous monomers and polymerization of same was repeated exactly as described above.

The resulting ethylene-propylene copolymer was washed with water and then methanol and there resulted a yield of 33 grams of an off-white copolymer having the properties listed in Table 1 below.

EXAMPLE 3

Tank 1 was charged with propylene to a pressure of 75 psig and charge valves were opened to admit the propylene into the reactor 1 which was previously charged with catalyst and solvent of the types and amounts described in Example 1. The tanks 1, 2 and 3 had a capacity of 500 cc each. The reactor was maintained at a temperature of 65° C. Propylene was fed into tank 1 until the pressure in tank 1 was 75 psig and then fed to the reactor until the pressure dropped to 15 psig which took about 30 minutes whereupon more propylene was charged into tank 1 to bring the pressure up to 30 psig and again passed to the reactor over a period of about 15 minutes until the pressure in tank 1 reached 15 psig. This amounted to approximately 2500 cc of propylene over a period of ¾ of an hour.

Thereafter, tank 1 was charged to 75 psig with propylene and tank 2 was charged to 75 psig with ethylene. The contents of tank 2 were fed into the contents of tank 1 which were allowed to continuously feed into the reactor until the pressure in tanks 1 and 2 dropped to about 39 psig. This took another 43 minutes and at that time about 2400 cc of the mixed propylene ethylene gas had been sent to the reactor.

Thereafter, tanks 1 and 2 were flushed and charged with propylene to about 39 psig. Each tank was then charged with ethylene to bring the pressure therein to 75 psig. The contents of tank 3 were allowed to continually flow into the contents of tank 2 which were allowed to continually flow into the contents of tank 1 which were allowed to continually run into the reactor until the pressure in all tanks reached 37 psig. This operation took approximately 70 minutes.

Thereafter, the pressure in tank 1 was kept at 35 psig and tank 2 was flushed with propylene and then charged to 35 psig. The contents of tank 2 were allowed to continually flow into the contents of tank 1 which were allowed to continually flow into the reactor until the pressure in both tanks reached 5 psig. This took place over a period of about 40 minutes. At this point the flow from tank 2 to tank 1 was stopped and tank 1 was charged with additional propylene up to a pressure of 15 psig. The contents of tank 1 were then permitted to flow into the reactor until a pressure of 5 psig was reached. Tank 1 was charged to 15 psig with propylene again and discharged to the reactor to 5 psig. The addition of this additional propylene took place over an additional period of about 10 minutes. Thereafter, tank 1 was charged with propylene to a pressure of 75 psig. The propylene in tank 1 was allowed to flow into the reactor until the pressure of tank 1 dropped to about 15 psig. This took about 30 minutes. Then tank 1 was recharged with propylene to 30 psig and this amount of propylene was then allowed to flow into the reactor until the pressure in tank 1 reached 15 psig. The addition of this additional propylene took about approximately 15 minutes. The total amount of propylene added to this phase was about 2500 cc.

There was obtained a yield of 17 grams of copolymer having the properties listed in Table 1 below.

EXAMPLE 4

Example 3 was repeated. Upon completion hydrogen was added to the reactor at a pressure of 5 psig for about 15 minutes. After this amount of hydrogen had been added to the reactor, the sequence and amounts of addition of gaseous monomers as described in Example 3 was repeated once more. Thereafter, the contents of the reactor were worked up and provided a yield of 41.5 grams of copolymer having the properties as listed in Table 1 below.

EXAMPLE 5

The reactor was charged with 10 mmols of titanium trichloride, 30 mmols of aluminum diethylchloride, 1 mmol diethyl zinc (chain transfer agent) in about 115 milliliters of dry degassed hexane. The reactor was maintained at room temperature. Tanks 1, 2 and 3 were used and each had a capacity of 500 cc. Tank 1 was charged with propylene to a pressure of 75 psig and the contents of tank 1 were allowed to flow into the reactor until the pressure in tank 1 dropped to 15 psig. This took approximately 10 minutes. Thereafter, tank 1 was charged to 30 psig with propylene which was then allowed to flow into the reactor until the pressure in tank 1 reached 15 psig. This took about another 6 minutes.

Thereafter, tanks 1 and 3 were filled with propylene and tank 2 was filled with ethylene to a pressure of 75 psig. During this interim the reactor was held for about 5 minutes. The contents of tank 3 were allowed to flow into the contents of tank 2 which were allowed to flow into the contents of tank 1 which were allowed to flow into the reactor. This is allowed to continue until the pressure in the tanks reached about 8 psig. This consumed about 146 minutes. Then propylene was added to tank 1 to increase its pressure to 30 psig. Tanks 2 and 3 were cut-off from tank 1 and the contents of tank 1 were allowed to flow into the reactor until the pressure dropped to about 10 psig. This took approximately 20 minutes. At this point, all tanks were flushed with propylene and tank 1 was filled with propylene to a pressure of 60 psig. The propylene in tank 1 was allowed to pass into the reactor until the pressure dropped to about 20 psig which consumed about 20 minutes. Propylene was again charged to tank 1 to raise the pressure therein to 55 psig. Then the propylene in tank 1 was allowed to flow into the reactor until the pressure in tank 1 reached 0 psig.

There was obtained 17 grams of a copolymer having the properties listed in Table 1 below.

EXAMPLE 6

The reactor was degassed with nitrogen and was charged with 300 milliliters of hexane degassed with nitrogen and the reactor was heated to about 60° C under nitrogen Then 10 mmols of titanium trichloride, 50 mmols of aluminum diethylchloride was added to the reactor maintained at and room temperature. Tank 1 was filled with propylene to a pressure of about 75 psig. All tanks had a capacity of 500 cc. The contents of tank 1 were fed into the reactor to about 0 psig. Then, tank 1 was filled with propylene to 75 psig. Tank 2 was filled with ethylene to 75 psig. Tank 3 was filled with propylene to 75 psig. The contents of tank 3 were fed to the contents of tank 2 which were fed to the contents of tank 1 which were fed into the reactor until the pressure dropped to about 2.0 psig. Thereafter, tank 1 was recharged with propylene to about 10 psig which was fed into the reactor down to about 0 psig. Thereafter, tank 1 was filled with propylene to 75 psig which was fed into the reactor down to 0 psig. Then, tank 1 was recharged with propylene to 75 psig which was fed into the reactor down to about 0 psig. Then, tanks 1, 2 and 3 were filled to 75 psig, respectively, with propylene, ethylene and propylene. The contents of these tanks were fed as described above ultimately into the reactor down to about 0 psig. Tank 1 was filled with propylene to 10 psig and fed into the reactor down to 0 psig. Tank 1 again was filled with propylene to 75 psig which was fed into the reactor down to 0 psig. There resulted a copolymer having the properties listed in Table 1 below.

EXAMPLE 7

The reactor was charged with 10 mmols of titanium trichloride, 30 mmols of aluminum diethyl chloride, 2 mmols of diethyl zinc and 115 milliliters hexane. Tanks 1 and 2 and 3 had a capacity of 500 cc. Tank 1 was filled with propylene to a pressure of 75 psig which was then fed into the reactor which was maintained at about room temperature (23°-25°) until the pressure in tank 1 dropped to 15 psig. This took about 1¾ minute. The pressure in tank 1 was increased with propylene to 30 psig which was then fed into the reactor until the pressure dropped to 15 psig which took about another 1¾ minutes.

After elapse of about 4 minutes, tank 1 was filled with propylene, tank 2 was filled with ethylene and tank 3 was filled with propylene all to a pressure of 75 psig. The contents of tank 3 were fed to the contents of tank 2 which were fed to the contents of tank 1 which were fed to the reactor until the pressure in all tanks dropped to 0 psig. This took approximately 77 minutes. There was obtained 8.6 grams of a copolymer having the properties as listed in Table 1 below.

EXAMPLE 8

The apparatus used in this Example included tanks 1 and 3 having a capacity of 500 cc and tank 2 having a capacity of 300 cc. The reactor was charged with the same types and amounts of catalyst, solvent and chain transfer agent as described in Example 6. Tank 1 was charged to 75 psig with propylene and passed into the reactor to 15 psig. Tank 1 was then recharged to 30 psig with propylene which was then passed to the reactor until the pressure dropped to 15 psig. The reactor was allowed to remain at room temperature (about 23° to 25° C) throughout the polymerization. The total amount of propylene thus passed into the reactor was about 2500 cc based on room temperaure and one atmosphere pressure. The total time of addition was a little over 3 minutes. Then after waiting about 4 minutes, tank 2 was flushed with propylene, charged up to 69 psig of ethylene and then up to 75 psig with propylene. Propylene was charged to tanks 1 and 3 to a pressure of 75 psig in each. Thereafter, the contents of tank 3 were allowed to flow into the contents of tank 2 which were allowed to flow into the contents of tank 1 which were fed to the reactor until the pressure reached about 7 psig. This took almost three hours. Tank 1 was then charged with propylene to a pressure of about 17 psig and this was allowed to be fed into the reactor until the pressure reached about 3 psig. This took about 53 minutes. Thereafter, tank 1 was flushed with propylene and charged to 75 psig with propylene which was then fed into the reactor until the pressure dropped to 15 psig over a period of about 14 minutes. There was obtained a yield of about 10.4 grams having the properties listed in Table 1 below.

EXAMPLE 9

The reactor was charged with 60 milliliters of dry, degassed hexane, 30 mmols of aluminum diethyl chloride and 10 mmols of titanium trichloride. All three tanks had a capacity of 55 cc. All tanks were flushed with propylene. The reactor was maintained at room temperature. Tank 1 was filled with propylene to 60 psig and fed into the reactor down to 6 psig. It was recharged to 18 psig and fed to the reactor down to 8 psig. This took approximately 4 minutes. Tank 1 was charged with propylene to 60 psig. Tank 2 was charged with ethylene to 60 psig and tank 3 with propylene to 60 psig. The contents of tank 3 were fed into the contents of tank 2 which were fed into the contents of tank 1 which were fed to the reactor until the pressure dropped to about 0 psig. Tank 1 was then flushed with propylene (the other tanks being closed off) and pressurized to 15 psig with propylene which was fed into the reactor down to about 1 psig. The pressure in tank 1 was raised to 60 psig by adding propylene which was then fed into the reactor until the pressure dropped to 10 psig. Tank 1 was recharged to 30 psig with propylene and this was fed into the reactor down to 15 psig. There was obtained about 16.5 grams of copolymer having the properties listed in Table 1 below.

EXAMPLE 10

The reactor was charged with 100 milliliter of dry, degassed hexane, 30 mmols of aluminum diethylchloride and 10 mmols of titanium trichloride. All three tanks had a capacity of 500 cc and the reactor was maintained at room temperature throughout the polymerization. Tank 1 was filled with propylene to 75 psig and fed into the reactor down to about 10 psig. This took about one hour after which time all tanks and reactor were purged with nitrogen. Tank 1 was filled with propylene, tank 2 with ethylene and tank 3 with propylene each up to a pressure of about 75 psig. The contents of tank 3 were allowed to flow into the contents of tank 2 which were allowed to flow into the contents of tank 1 which were allowed to flow into the reactor until the pressure in all tanks dropped to about 5 psig. This took about an additional 85 minutes. Then, tank 1 was charged with propylene to 30 psig which was fed into the reactor down to 15 psig. Propylene was again charged to tank 1 up to 75 psig and this was fed into the tank down to about 0 psig. This took approximately 53 minutes. There was obtained 12.7 grams of copolymer having the properties listed in Table 1 below.

EXAMPLE 11

The steps of Example 1 were repeated utilizing a different batch of catalyst. There was obtained a yield of 16.1 grams of copolymer having the properties listed in Table 1 below.

EXAMPLE 12

The reactor was charged with the solvents and catalyst as described in Example 3. The reactor was maintained at room temperature. Tank 1 was charged with propylene up to 75 psig which was fed into the reactor down to 15 psig. Tank 1 was recharged with propylene to 30 psig and fed into the reactor down to 15 psig taking about ¾ hour in all.

Tank 1 was refilled with propylene and tank 2 with ethylene both to a pressure of 75 psig. The contents of tank 2 were fed into the contents of tank 2 which were fed into the reactor until the pressure dropped to 39 psig. This took about 93 minutes. Thereafter, tanks 1, 2 and 3 were each charged with propylene to 39 psig and then with ethylene to 75 psig. The contents of tank 3 were fed to the contents of tank 2 which were fed to the contents of tank 1 which were fed to the reactor until the pressure dropped to 37 psig which took about 70 minutes. Thereafter, tank 1 was held at 35 psig. Tank 2 was flushed with propylene and then charged with propylene to 35 psig. The contents of tank 2 were fed to the contents of tank 1 which were fed to the reactor. Tank 1 was then recharged with propylene to 15 psig which was then fed into the reactor down to 5 psig. Again, tank 1 was recharged with propylene to 15 psig which was fed to the reactor down to 5 psig. This entire sequence took about 50 minutes.

Thereafter, tank 1 was pressurized to 75 psig with propylene which was fed into the reactor to a pressure of 15 psig. Tank 1 was then recharged to 30 psig with propylene which was fed into the tank down to a pressure of 15 psig. This entire sequence took 45 minutes. There resulted 19.2 grams of copolymer having the properties listed in Table 1 below.

EXAMPLE 13

The reactor was charged with the same types and amounts of catalyst and solvents as described in Example 1. Tanks 1, 2 and 3 each had a capacity of 500 cc and the reactor was maintained at room temperature. Tank 1 was filled with propylene to a pressure of 75 psig which was fed into the reactor over a period of 23 minutes until the pressure dropped to 39 psig. Tank 1 was then recharged with propylene to 75 psig and tank 2 was filled with ethylene to a pressure of 75 psig. The contents of tank 2 were fed into the contents of tank 1 which were fed into the reactor until the pressure dropped to 48 psig in both tanks. This took about 32 minutes.

Thereafter, tanks 1, 2 and 3 were flushed with propylene and each was filled with propylene to 48 psig. Each tank was then filled further with ethylene to 75 psig. The contents of tank 3 were run into the contents of tank 2 which were run into the contents of tank 1 which were run into the reactor until the pressure in all tanks dropped to 9 psig. This took about 2 hours.

Into tank 1 there was introduced additional propylene to 24 psig followed by the addition of ethylene to 30 psig. Tank 2 was flushed with propylene and was charged to 30 psig with propylene. The contents of tank 2 were allowed to feed into the contents of tank 1 which were allowed to be fed into the reactor until the pressure in both tanks dropped to 6 psig. This took about 30 minutes. Propylene was added to both tanks to raise the pressure to 15 psig and the contents were allowed to feed into the reactor until the pressure reached 5 psig.

Thereafter, tank 1 was filled with propylene to a pressure of 75 psig. The contents of tank 1 were fed into the reactor until the pressure dropped to 39 psig which took about 23 minutes. There resulted a yield of 5.7 grams of a copolymer having the properties listed in Table 1 below.

EXAMPLE 14

The reactor was charged with catalyst and solvent of the types and amounts described in Example 1. Tank 1 was filled with propylene to a pressure of 30 psig which was then run into the reactor down to a pressure of 15 psig which took about 9 minutes. Thereafter, tank 1 was filled with propylene to 75 psig. Tank 2 was filled with ethylene to 75 psig. The contents of tank 2 were run into the contents of tank 1 which were run into the reactor until the pressure dropped in both tanks to 16.5 psig. This took about 70 minutes.

Thereafter, tanks 1, 2 and 3 were flushed with propylene and each was pressurized with propylene to 21.9 psig. Ethylene was added to each tank up to a pressure of 90.5 psig. The contents of tank 3 were fed into the contents of tank 2 which were fed into the contents of tank 1 which were fed into the reactor until the pressure in all tanks dropped to 53.5 psig taking about 67 minutes.

Tank 1 was allowed to remain at 53.5 psig. Tank 2 was flushed with propylene and pressurized to 53.5 psig with propylene. The contents of tank 2 were allowed to be fed into the contents of tank 1 which were allowed to be fed into the reactor until the pressure dropped to about 5 psig which took about 60 minutes. Both tanks were repressurized to 15 psig with propylene and fed into the reactor as described above until the pressure dropped to 5 psig and both were recharged again to 15 psig and fed into the reactor down to 5 psig, taking about 10 minutes.

Thereafter, tank 1 was filled with propylene to 30 psig which was fed into the reactor down to 15 psig taking about 9 minutes. There resulted 7 grams of a copolymer having the properties listed in Table 1 below.

EXAMPLE 15

The reactor was charged with the catalyst and solvent of the types and amounts described in Example 1. The reactor was maintained at room temperature. Tank 1 was filled with propylene to 30 psig which was fed into the reactor down to 19 psig, taking about 6 minutes.

Tank 1 was filled with propylene to 75 psig and tank 2 was filled with ethylene to 75 psig. The contents of tank 2 were fed into the contents of tank 1 which were fed into the reactor until the pressure dropped to 39 psig taking about 43 minutes. Thereafter, all three tanks were flushed with propylene and propylene was added to each up to 55.8 psig. Ethylene was then added to each tank up to 103 psig. The contents of tank 3 were fed into the contents of tank 2 which were fed into the contents of tank 1 which were fed into the reactor until the pressure dropped to 35 psig taking about 124 minutes. Thereafter, tank 1 was allowed to remain at 35 psig, tank 2 was flushed with propylene and charged therewith to 35 psig. The contents of tank 2 were fed into the contents of tank 1 which were fed into the reactor until the pressure dropped to 5 psig taking 35 minutes. Tank 1 was charged with propylene to 15 psig which was fed into the reactor to 5 psig. It was recharged to 15 psig with propylene which was fed into the reactor down to 5 psig. These repetitions took 10 minutes.

Tank 1 was then charged with propylene to 30 psig which was fed into the reactor down to 19 psig taking about 6 minutes. There resulted 10.4 grams of copolymer having the properties listed in Table 1.

EXAMPLE 16

This Example does not illustrate the present invention but describes the preparation of a prior art copolymer for comparison purposes.

The reactor was filled with catalyst and solvent of the types and amounts listed in Example 1. The reactor was maintained at room temperature. Tanks 1, 2 and 3 were charged with propylene to 39 psig and then with ethylene to 75 psig. The contents of tank 3 were fed to those of tank 2 which were fed to those of tank 1 which were fed into the reactor until the pressure reached 0 psig taking 125 minutes. All tanks were then recharged with ethylene to 33 psig and then with propylene to 75 psig. The contents of the tanks were fed as described above until the pressure reached 20 psig. This took about 100 minutes. There resulted 8.5 grams of a copolymer which is not an embodiment of this invention and which had the properties set forth in Table 1 below.

TABLE 1

| Example | % Ethylene Max. | Overall | TM (psi) | TS (psi) | Elongation at Break (%) | PI (ft.l./in$^3$) | T$_2$(° C) | Melt Index |
|---|---|---|---|---|---|---|---|---|
| 1 | 50 | 20 | 65,800 | 5290 | 760 | 370 | | NF* |
| 2 | 25 | 12 | 41,300 | 1520 | 66 | 88 | | 1.5 |
| 3 | 40 | 20 | 42,800 | 1750 | 330 | 193 | | 1.38 |
| 4 | 40 | 20 | 45,300 | 3250 | 780 | 322 | | 0.6 |
| 5 | 50 | 18 | 26,000 | 2000 | 570 | 440 | 148 | 0.4 |
| 6 | 50 | 20 | 16,500 | 900 | 160 | 530 | | 3.0 |
| 7 | 25 | 10 | 65,000 | 4100 | 890 | 119 | 157 | 1.25 |
| 8 | 40 | 15 | 39,300 | 3550 | 540 | 365 | 140 | 0.14 |
| 9 | 50 | 20 | 30,000 | 3000 | 815 | >580 | 153 | |
| 10 | 50 | 25 | 25,000 | 1900 | 520 | >500 | 145 | 0.21 |
| 11 | 50 | 20 | 57,000 | 3200 | 570 | 429 | — | 0.45 |
| 12 | 40 | 20 | 30,000 | 2300 | 528 | >490 | — | NF* |
| 13 | 30 | 20 | 35,000 | 3400 | 700 | 373 | — | 2.01 |
| 14 | 40 | 10 | 46,000 | 4100 | 753 | >540 | — | |
| 12 | 40 | 20 | 30,000 | 2300 | 528 | >490 | — | NF* |
| 15 | 40 | 30 | 6,700 | 1730 | 705 | >460 | 125 | NF* |
| 16 | 40 | 40 | 5,900 | 420 | 41 | 289 | — | NF* |

*No Flow

The properties of various commercial resins are given in Table 2 below for comparison purposes.

TABLE 2

| Identity | % Ethylene | TM (psi) | TS (psi) | Elongation at Break (%) | PI (ft.lb./in.$^3$) | T$_2$(° C) | Melt Index |
|---|---|---|---|---|---|---|---|
| Comm'l polypropylene | 0 | 120,000 | 4160 | 700 | 20 | 155 | 155 |
| Comm'l high impact ethylene-propylene copolymer | 31 | 76,000 | 2240 | 270 | 135 | 143 | |
| Comm'l LDPE | 100 | 22,900 | 1920 | 730 | — | 110 | |
| Comm'l ethylene-ethyl acrylate copolymer | | 5,000 | 2400 | 1050 | 7340 | 80 | |
| Comm'l ethylene-propylene copolymer rubber | 36 | 15,700 | 1360 | 390 | 300 | 150 | |

What is claimed is:

1. Polymer of at least two different olefinic monomers capable of polymerizing with themselves and each other, said polymer comprising a plurality of polymer chains along which the proportion of mer units provided by a first said monomer for a given first chain length gradually increases as the proportion of mer units provided by a second said monomer along said first chain length gradually decreases to a second chain length along which the proportion of mer units provided by said first and second monomers, respectively, remain substantially constant throughout said second chain length.

2. Polymer as claimed in claim 1 wherein said polymer chain comprise a third chain length along which the proportion of mer units provided by said first monomer is greater than the minimum proportion of said mer units in said given first chain length and remains substantially constant throughout said third chain length, said third chain length being connected to one end of a fourth chain length which is connected at its other end to said given first chain length, the proportion of mer units provided by said first monomer gradually diminishes along said fourth chain length as the proportion of mer units provided by said second monomer gradually increases along said fourth chain length to the respective proportions of mer units provided by said first and second monomers at the beginning of said given first chain length at the point of attachment of said fourth chain length to said given first chain length.

3. Polymer as claimed in claim 2 wherein said first and fourth chain lengths are connected by a fifth chain length in which the respective proportions of the respective mer units remain substantially constant throughout said fifth chain length and said respective proportions are essentially the same as at the beginning of said given first chain length.

4. Polymer as claimed in claim 3 wherein said chain lengths are repeated in substantially the same order and proportions in said polymer chain.

5. Polymer as claimed in claim 1 wherein said polymer chains comprise a third chain length connected to the second chain length at the end opposite to that to which the first chain length is connected and along which the proportion of mer units provided by said first monomer decreases as the proportion of mer units provided by said second monomer increases.

6. Polymer as claimed in claim 1 wherein said polymer chains comprise a third chain length connected to the end of said first chain length opposite to that to which said second chain length is connected and the respective proportions of mer units provided by the first and second monomers is substantially the same as the approximate levels existing at the end of said first chain length to which the third chain length is connected.

7. Polymer as claimed in claim 1 wherein said second monomer is ethylene.

8. Polymer as claimed in claim 7 wherein said first monomer is propylene.

9. Polymer as claimed in claim 8 wherein the proportion of propylene in said second chain length is one hundred percent.

10. Polymer as claimed in claim 8 wherein the total amount of ethylene is about 15 to about 30 wt.%.

11. Polymer as claimed in claim 2 wherein the first monomer is propylene and the second monomer is ethylene.

12. Polymer as claimed in claim 11 wherein the said second and third chain lengths are one hundred percent propylene.

13. Polymer as claimed in claim 12 wherein said second and third chain lengths comprise isotactic propylene.

14. Polymer as claimed in claim 13 wherein said second and third chain lengths comprise about 10 to about 50 wt.% of said polymer chains.

15. Polymer as claimed in claim 13 wherein the proportion of ethylene mer units at the point of attachment of said fourth chain length to said first chain length is about 40 to about 60 wt.%.

16. Polymer as claimed in claim 2 wherein said polymer has a tensile modulus of about 5,000 to 30,000 psi.

17. Polymer as claimed in claim 11 wherein the total amount of ethylene is about 15 to about 30 wt.%.

18. Polymer as claimed in claim 2 wherein said polymer has a melt index of about 0.5 to about 5.0 grams/10 min. at 220° C and 1P (43.25 psi).

19. A non-uniform, thermoplastic copolymer of ethylene and a non-ethylene α-olefin, said non-uniform, thermoplastic copolymer prepared by the process which comprises, introducing a primary gaseous polymerizable feed composition containing at least one monomer selected from the group consisting of ethylene and a non-ethylene α-olefin from at least one primary feed source to a polymerization zone, said primary gaseous polymerizable feed composition continually varying in compositional content of the polymerizable reactants therein during said continuous introduction; simultaneously adding to said primary feed source the other said gaseous polymerizable monomer selected from the group consisting of ethylene and a non-ethylene α-olefin from at least one secondary feed source so as to continually change the compositional content of said primary polymerizable feed composition in said primary feed source; and continuously polymerizing the primary gaseous polymerizable feed composition introduced to the polymerization zone until desired polymerization has been achieved, said primary gaseous polymerizable feed composition being different from said secondary polymerizable feed composition.

20. Copolymer as claimed in claim 19 wherein said process for preparing same includes the step of introducing a gaseous polymerization feed composition containing said non-ethylene alpha-olefin and having a constant composition into said polymerization zone before and/or after introduction of the primary and/or secondary gaseous polymerizable feed compositions into said polymerization zone.

* * * * *